Figure 1:
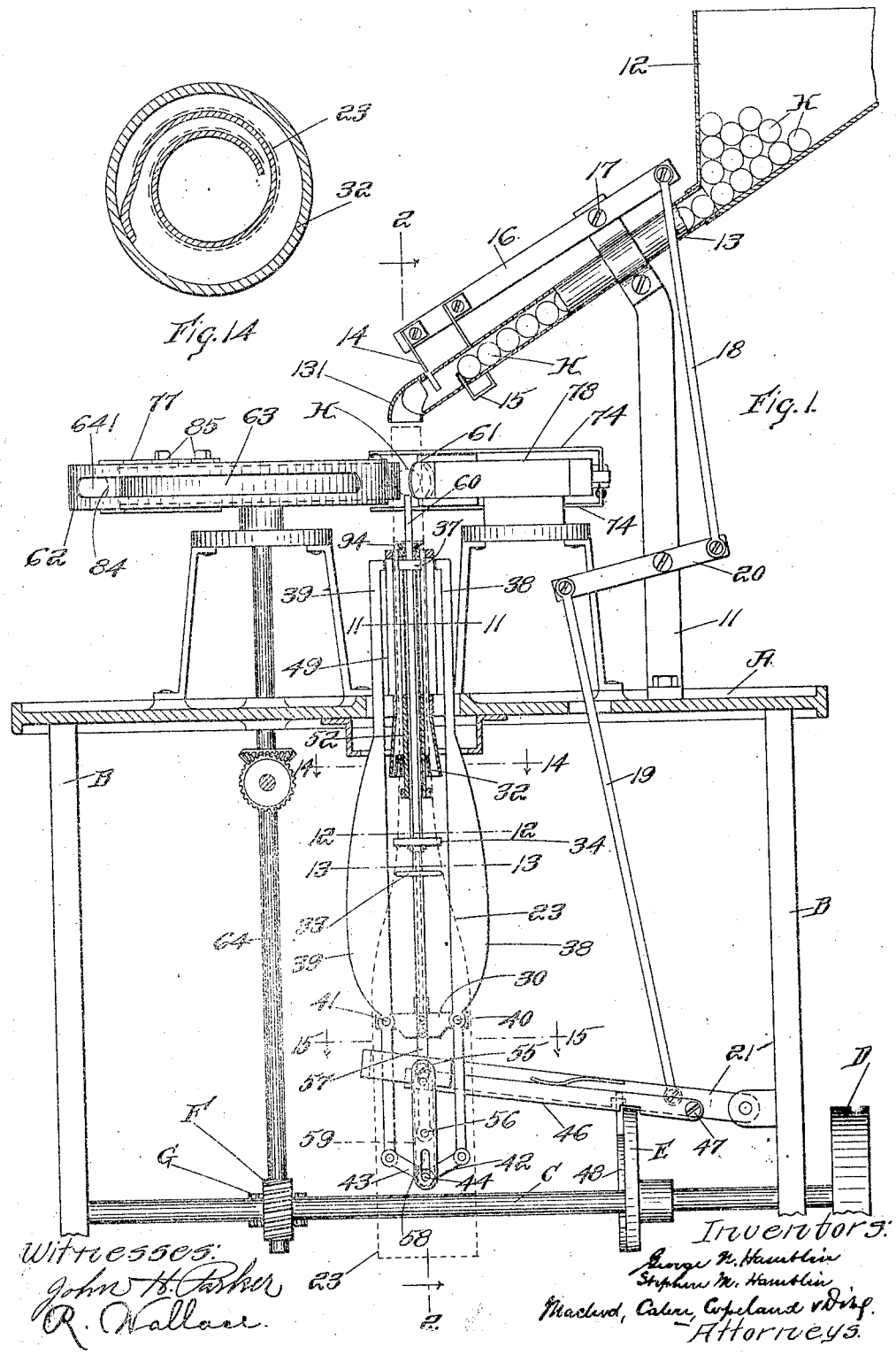

S. M. & G. N. HAMBLIN.
CANDY WRAPPING MACHINE.
APPLICATION FILED JAN. 3, 1911.

1,025,524.

Patented May 7, 1912.

5 SHEETS—SHEET 1.

S. M. & G. N. HAMBLIN.
CANDY WRAPPING MACHINE.
APPLICATION FILED JAN. 3, 1911.
1,025,524.
Patented May 7, 1912.
5 SHEETS—SHEET 3.
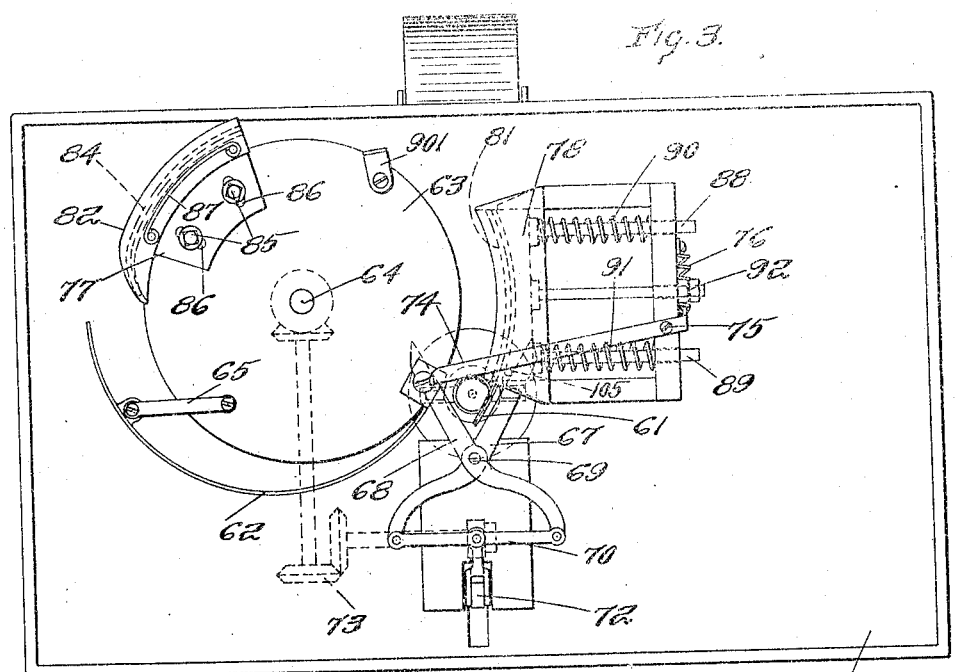
Fig. 3.
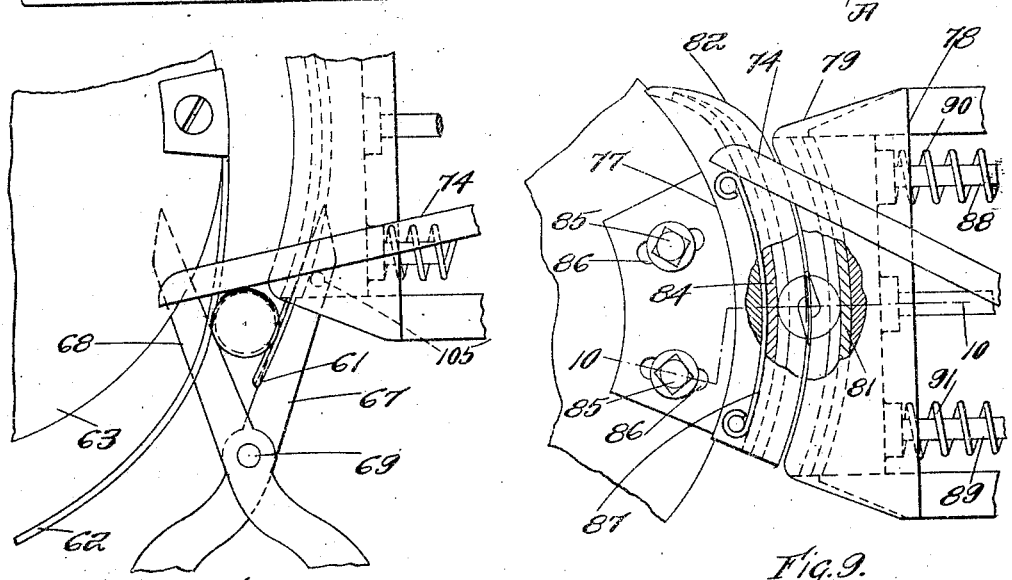
Fig. 8.
Fig. 9.
Witnesses:
John H. Parker
R. Wallace
Inventors:
George N. Hamblin
Stephen M. Hamblin
by MacLeod, Calver, Copeland & Dike
Attorneys.

S. M. & G. N. HAMBLIN.
CANDY WRAPPING MACHINE.
APPLICATION FILED JAN. 3, 1911.
1,025,524.
Patented May 7, 1912.
5 SHEETS—SHEET 4.
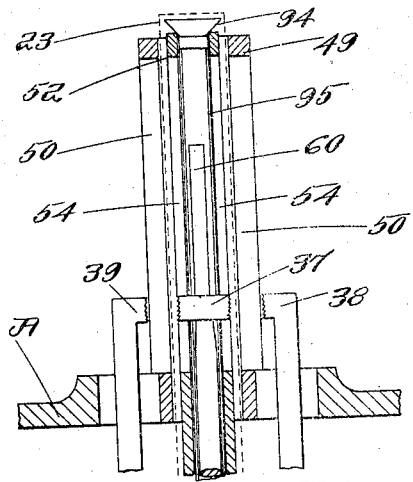
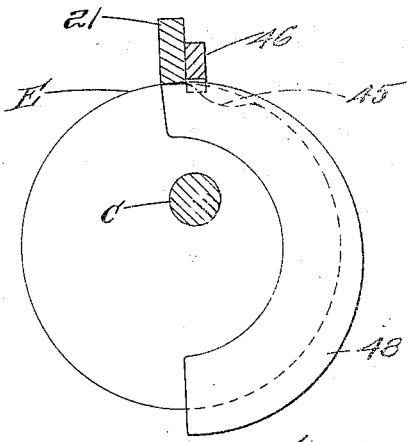
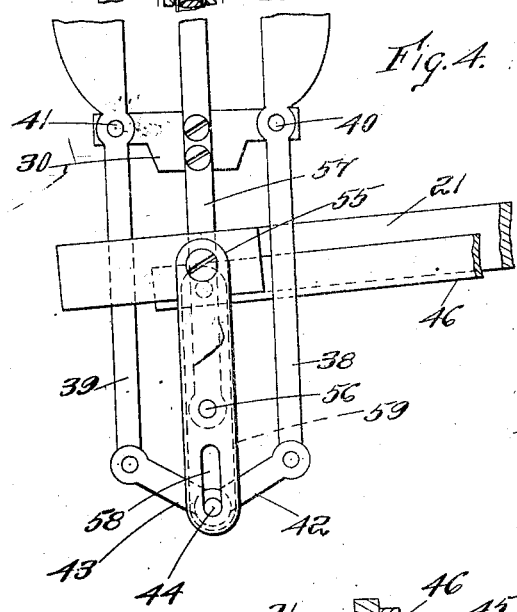
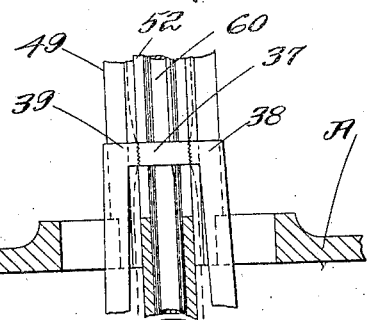
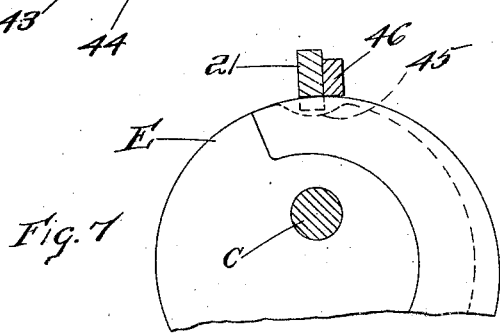
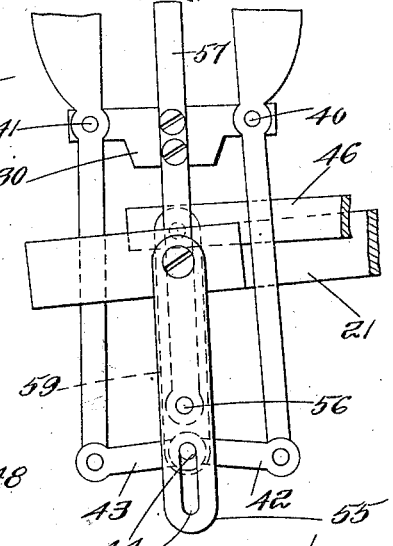
Fig. 4.   Fig. 6.   Fig. 5.   Fig. 7.
Witnesses:
John H. Parker
R. Wallace.
Inventors:
George N. Hamblin
Stephen M. Hamblin
by Macleod, Calver, Copeland & Dike
Attorneys.

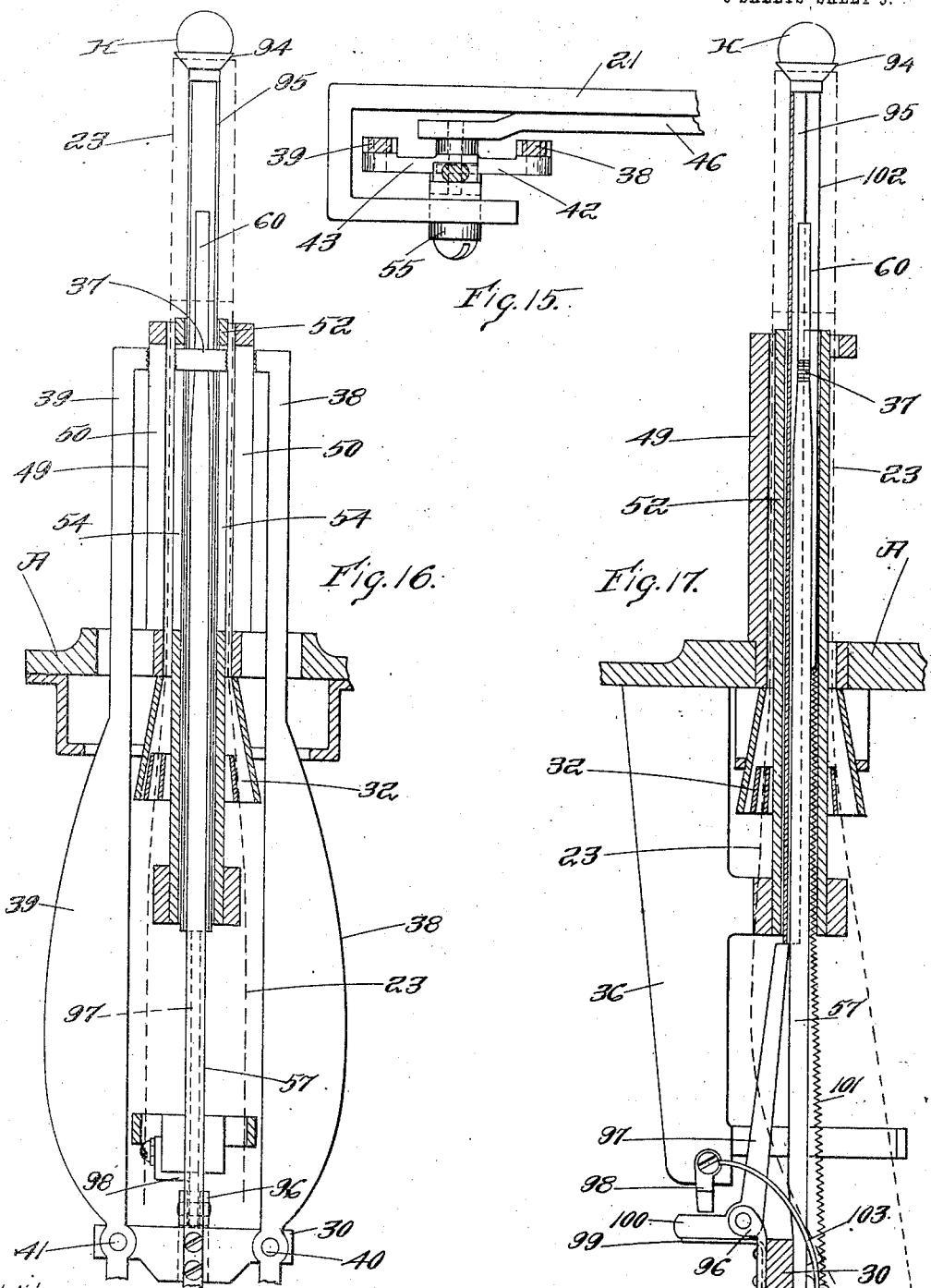

UNITED STATES PATENT OFFICE.

STEPHEN M. HAMBLIN AND GEORGE N. HAMBLIN, OF CANTON, MASSACHUSETTS; SAID GEORGE N. HAMBLIN ASSIGNOR OF ONE-HALF HIS RIGHT TO GEORGE E. CLOSE, OF CAMBRIDGE, MASSACHUSETTS.

CANDY-WRAPPING MACHINE.

1,025,524.

Specification of Letters Patent.

Patented May 7, 1912.

Application filed January 2, 1911. Serial No. 600,620.

*To all whom it may concern:*

Be it known that we, STEPHEN M. HAMBLIN and GEORGE N. HAMBLIN, citizens of the United States, residing at Canton, county of Norfolk, State of Massachusetts, have invented a certain new and useful Improvement in Candy-Wrapping Machines, of which the following is a specification, reference being had therein to the accompanying drawings.

The present invention has for its object to provide a rapid and efficient machine for wrapping individual pieces of candy in waxed or parchmentized paper, the ends of the wrappers being twisted on each side of the candy, and extending away from it in the well known manner usually employed in the manufacture of candy kisses.

The machine embodying the invention is intended particularly for wrapping globular pieces of hard candy, or candy balls, in wrappers which are cut from a web of properly prepared and printed paper.

In United States Letters Patent, dated March 1, 1904, No. 753,571, granted to Stephen M. Hamblin, there is shown and described a wrapping machine in which the wrapping paper was formed into a horizontal trough in which was deposited successively individual pieces of candy after which the paper was folded thereon and severed, the ends being then twisted to form the wrapper.

The machine embodying our present invention forms the wrapping paper into a vertical tube as distinguished from a horizontal trough and introduces the candy into the upper end of the tube instead of into the open side of the trough as heretofore. The candy is supported in the proper position in the tube by means of an element which is denominated a placer, the tube is then severed at the proper point below the candy, after which the severed portion of the tube and the ball therein pass through the twisting instrumentalities, and the completely wrapped piece of candy is ejected into a suitable hopper or container.

While we have described our machine in the present specification in the form specifically adapted for use in wrapping candy balls we contemplate its use on candy cut into other shapes which approximate the spherical sufficiently to be operated upon successfully by our improved machine.

The invention will be fully understood from the following description taken in connection with the accompanying drawings, and the novel features thereof are pointed out and clearly defined in the claims at the close of this specification.

Figure 2:
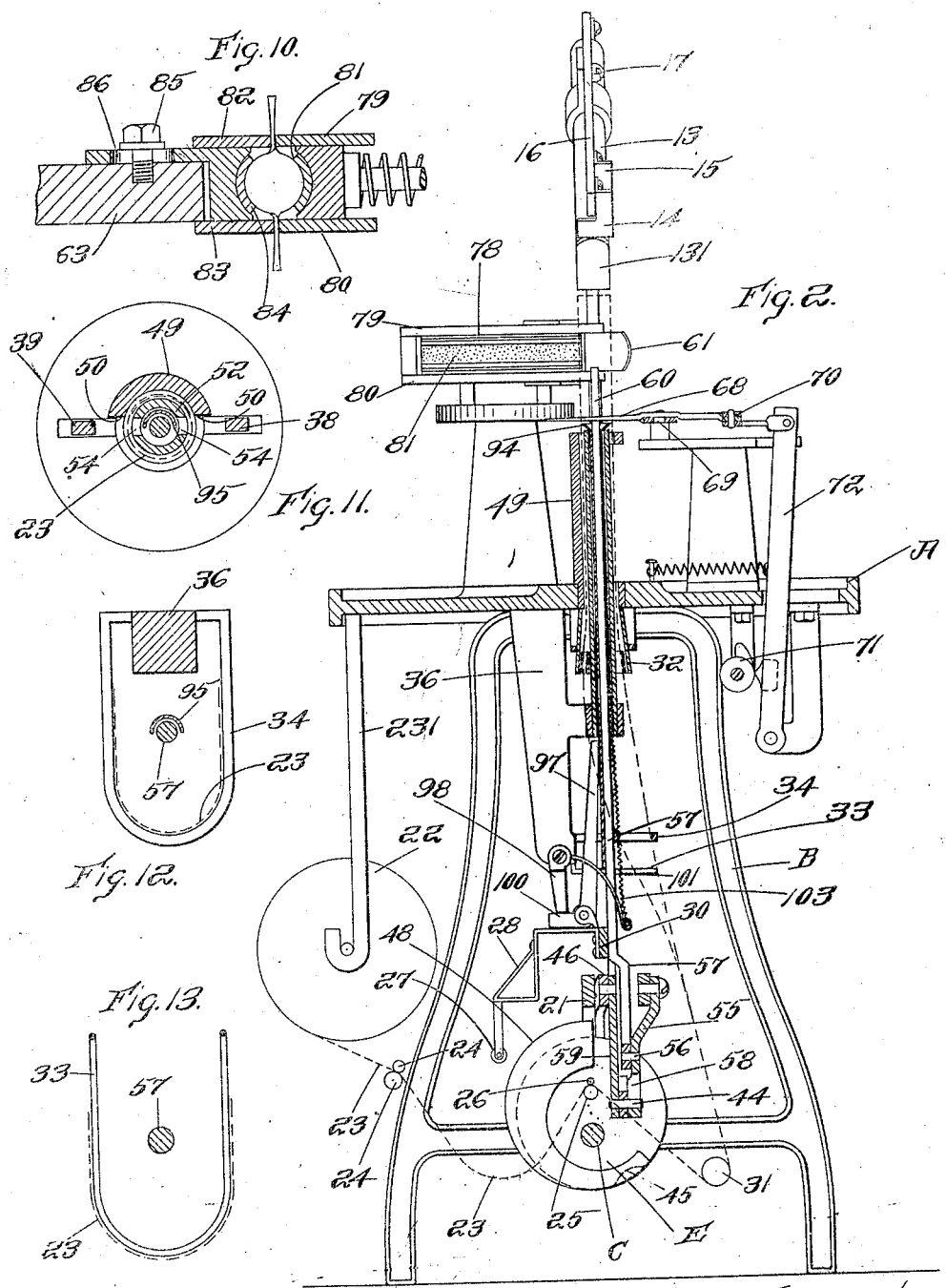

Referring to the drawings,—Figure 1 is a front elevation of a machine embodying the invention. Fig. 2 is a vertical section of the machine taken on line 2—2, Fig. 1. Fig. 3 is a top plan view of the machine with the feeding mechanism removed. Figs. 4, 5, 16 and 17 show two different positions of the grippers and their operating means, and of the cup and its operating mechanism. Figs. 6 and 7 are details of the cams and cam levers. Fig. 8 is a detail of the shears or severing mechanism. Fig. 9 is a detail of the twisting mechanism, certain portions thereof being in section for greater clearness. Fig. 10 is a section on line 10—10, Fig. 9. Fig. 11 is a section on line 11—11, Fig. 1. Fig. 12 is a section on line 12—12, Fig. 1. Fig. 13 is a section on line 13—13, Fig. 1. Fig. 14 is a section on line 14—14, Fig. 1. Fig. 15 is a section on line 15—15 looking in the direction of the arrows and illustrates the construction of the ends of the cam levers which operate the grippers and placer.

Referring now to the drawings, and more particularly to Figs. 1 and 2, there will be seen a table A supported on a frame B B of any suitable construction adapted to support the various instrumentalities. The main shaft is shown at C and has thereon a pulley D, a double cam E, which will be described in detail later on, and a spiral gear F, meshing with a second spiral gear G which operates the twisting and severing mechanisms.

The machine embodying our invention may for convenience of description be considered as comprising several groups of instrumentalities, as follows: (1) the feeding mechanism by means of which the candy balls are supplied at the proper intervals to the tube formed from the wrapping paper; (2) the paper supplying mechanism; (3) the tube-forming and feeding mechanism; (4) the shears, and, (5) the twisting mechanism.

The candy feeding mechanism will first be described: Supported on a suitable bracket I at the right hand side of the table A is located a hopper 12 having an inclined bottom leading to a tube or spout 13 which is of a size slightly larger than that of the candy balls H to be wrapped by the machine. The lower end of the spout 13 terminates in a guide 131 adapted to direct the balls downward and is located over the point at which the tube of paper is formed so that when the spout is opened, the balls of candy may roll down one by one, being guided by the guide 131 into a cup 94 which deposits the ball in the tube of paper. The balls of candy are fed singly, and at the proper time by means of an escapement comprising a first gate 14 and second gate 15. Said first and second gates are carried on a lever 16, pivoted at 17, and operated by links 18 and 19, and an intermediate lever 20 from the main cam lever 21 which will be hereinafter more fully described. It will be seen that when the lower end of the escapement lever 16 is depressed, the first gate 14 closes the end of the spout but the second gate 15 is out of the path of the candy balls so that the row of balls rests against the first gate 14. When the escapement lever 16 is moved into its opposite position the first gate 14 is moved out of the path of the balls, allowing the bottom ball to escape, while the second gate 15 holds back the other candy balls. The escapement is so timed by connection with the cam lever 21 that a single ball is delivered to the cup 94 which descends and deposits the ball in the open end of the tube of wrapping paper after the tube has been formed and raised into position.

The paper feeding mechanism will now be described. A roll or web 22 of suitable wrapping paper is supported in a bracket 231. From this roll 22 the web of wrapping paper 23 is led off. It passes first through a pair of guide rolls 24 then through a pair of snubbing rolls 25 and 26, one of which is preferably constructed of rubber so that a tension may be placed on the paper to prevent too rapid movement of the paper. The paper is drawn from the roll 22 by means of a striker roll 27 mounted on a bracket 28 which is itself carried on the vertically reciprocating cross head 30 on which the grippers, which will be hereinafter fully described, are also carried. Since the snubbing rolls 25 and 26 hold the strip of paper quite firmly, the downward movement of the striker roll 27 unwinds a certain amount of paper from the roll 22 every time that the striker roll descends. By this means an even supply of paper is provided without placing undue strain on it.

The tube forming mechanism will now be described: After passing through the snubbing rolls 25 and 26 the paper passes about a guide roll 31 and thence upwardly up through a helical feeding tube 32 by means of which and of certain other instrumentalities the paper is converted into a tube or cylinder of a diameter about equal to that of the candy ball to be wrapped. The paper is guided to the helical feeding tube 32 by means of a wire loop 33 (see Figs. 1, 2 and 13) which begins the work of converting the flat paper into a tube, and then through a guide (see Fig. 12) consisting of a horse-shoe shaped wire loop 34. In Figs. 12, 13 and 14 the paper is indicated by the dash lines 23. Said wire loop 33 and upper wire loop 34 are supported on a bracket 36 depending from the under side of the table A. The helical feeding tube 32 is flared slightly to facilitate the formation of the tube and its construction will be fully understood from an examination of Fig. 14 in which the feeding tube is shown in section. From this figure it will be seen that the paper comprising the tube is lapped for a distance of about equal to the diameter of the ball to be wrapped.

The paper tube thus formed is intermittently fed upwardly by means of three grippers, one of which 37 (see Figs. 1, 4, and 5) is located within the tube and the others of which, 38 and 39, are located outside the tube. The proximate faces of the three grippers are slightly serrated or knurled so that they may get a better grip upon the paper. The outside grippers 38 and 39 are fulcrumed at 40 and 41, respectively, to the cross-head 30 and extend below the said fulcrums 40 and 41, being engaged at their lower ends by means of a toggle joint composed of links 42 and 43, pivoted at 44. The opening and closing of the grippers at the proper times is accomplished by giving to the central pivot 44 of the toggle joint a greater or less upward or downward movement, as the case may be, than the movement of the lower ends of the outside grippers 38 and 39, so that the toggle joint is brought into action.

The cycle of movement of the grippers starting with them in the position which they are in Fig. 4 is as follows: First the grippers close upon the tube (see Fig. 5); then they move down carrying it with them for a short distance to smooth out the end of the tube which may have been crushed by the previous action of the severing mechanism; then they move up to the top of their stroke carrying the tube of paper with them; here they open and release the tube; and finally they move down to the position shown in Fig. 4. The closing of the grippers on the tube of paper is accomplished by causing the main cam lever 21 to descend suddenly by dropping into an indentation 45 in the cam E, while a secondary cam lever 46 which is pivoted at 47 to the main cam lever still rests on the periphery of a secondary cam 48 which is secured to the main cam E. The said secondary cam lever 46 is connected to the central pivot 44 of the toggle joint by a link 59. When the main cam lever 21 (see Fig. 7) drops into the indentation all three grippers descend together but since the secondary cam lever is still on the same level on the secondary cam 48 the central pivot of the toggle joint is moved up relatively to the lower ends of the two outside grippers being connected as previously stated to the secondary cam lever by link 59. The grippers are opened at the top of their stroke by the secondary cam lever 46 dropping off the end of the secondary cam 48. This moves the link 59 down relatively to the lower end of the two outside grippers.

The connection between the main cam lever 21, and the toggle joint consists of a link 55 which is pivoted at 56 to the lower end of the vertical reciprocating rod 57 upon which the central gripper is supported. The link 55 is also slotted as shown at 58 to guide the pin 44 comprising the central pivot of the toggle joint. The secondary cam lever 46 is connected by link 59 to the toggle joint by means of the central pivot 44. The end of the main cam lever is U-shaped, see Fig. 15, for the purpose of passing about the lower end of the central gripper rod.

The tube of paper is prevented from descending with the grippers during their down stroke by means which will be hereinafter described. The short downward movement of the grippers after they have closed upon the tube is for the purpose of straightening out the upper end of the tube which has previously been crushed by the severing mechanism. By reference to Fig. 4 it will be seen that the paper tube 23 lies between an exterior ring or tube 49 which is cut away at 50 to give the outside grippers access to the paper tube and a central tubular guide 52; also cut away at 54 to allow the interior gripper 37 to come in contact with the paper. This central tube 52 is immovable and is carried by the bracket 36 which supports the wire loops 33 and 34.

As previously described, the balls of candy are fed one by one from the spout 13. As the ball of candy leaves the spout it is received in the cup 94 supported on the upper end of the cup slide 95 in the center of which the placer 60 is located. In general the movement of the cup 94 is such that it carries the ball down into the tube of paper which has been formed as just described until the ball of candy rests on the upper end of a placer 60. The cup 94 is an important but not an altogether essential feature of our invention since it is possible but not as satisfactory to operate the machine by feeding the ball directly into the upper end of the tube of paper. However, when the machine is run at a high rate of speed we find it desirable to employ the cup as otherwise the tube of paper sometimes binds or crushes slightly under the weight of the ball as it falls from the spout and thereby causes the machine to miss. The manner in which the cup 94 is actuated will be understood from an examination of Figs. 16 and 17.

As previously stated the cup 94 is supported on the upper end of the cup slide 95. The cup slide partially incloses the vertical rod 57 on the upper end of which is located the placer, and the cup slide 95 is slidable relatively to the placer rod 57. On the cross-head 30 is secured a bracket 96 in which is pivoted a bell crank lever, one arm of which 97 constitutes a finger which normally leans against the placer rod 57 and the other arm 100 of said bell crank lever projects substantially horizontally and is adapted to contact with a dog 98 secured to the bracket 36 on the under side of the table. The finger 97 is held normally against the placer rod 57 by means of the leaf spring 99. It will therefore be seen that when the arm 100 contacts with the dog 98, the other finger 97 is momentarily held out of contact with the placer rod 57 thereby allowing the cup slide 95 to drop suddenly until the cup 94 rests on the upper edge of the tubular paper guide 52 as seen in Figs. 1 and 2.

To insure that the cup slide and cup fall the required distance as quickly as possible, I provide a spiral spring 101 secured to the cup by the wire 102 (see Fig. 17) and having its other end secured to a piece 103 on the fixed bracket 36. This spring insures great rapidity of action on the part of the cup and prevents any possibility of the finger 97 interfering with the movement of the cup. After the cup has fallen to the lowermost position which is at a point just below the shears, the cross-head 30 descends (the grippers being open) and carries with it the bell crank lever arm 97. Just before it reaches its lowermost position the grippers seize the paper and then make the preliminary downward motion previously described. This preliminary downward motion draws the end of the paper tube over the edge of the cup and straightens out the paper so that a perfectly formed tube is produced. Just before the lowermost point of motion of the cross-head 30 is reached the bell crank lever finger 97 rides off the lower end of the cup slide and is brought into contact with the placer rod 57. When the upward movement of the cross-head 30 begins the cup slide is lifted on the upper end of the bell crank lever finger 97 and the cup and tube of paper rises simultaneously to their position.

As previously described the balls of candy are dropped one by one into the cup 94 which descends into the open end of the paper tube and deposits the ball on the upper end of the placer 60 which is a finger or continuation on the placer rod 57. The parts are so timed that the central gripper is at the top of its movement at the moment when the ball drops out of the spout into the cup. As will be seen from Fig. 1, the tube extends above the ball on the placer 60 a distance sufficient to form the twist on the finished candy wrapper. When the candy ball is in place in the tube it is supported on the lower side, as previously stated, upon the upper end of the placer 60 and on the right hand side by a spoon-finger 61 which is composed of thin metal hollowed out to form a slight depression in which the curve of the candy ball rests.

The next step in the circle of movements of the machine is the severing of the tube of paper at the proper point below the candy ball. Before this can take place however it is necessary for the ball and tube to be held in the position just described and the placer removed. The candy ball and tube are held in place by means of a spring 62 carried on a rotating disk 63 which carries a moving twister by means of which the ends of the wrapper are twisted. The disk 63 is supported on the upper end of a shaft 64 driven by the spiral gears F and G. The spring 62 is slotted as seen at 641 Fig. 1 and is secured at one end to the disk and at the other end is guided by means of a link 65 pivoted at one end to the disk 63. By this means the spring 62 is free to yield somewhat so that it may hold the candy ball with a substantially uniform pressure against the spoon-finger 61. As the disk 63 rotates the candy ball is engaged by the edges of the slot 641 in the spring 62 and held firmly so that neither it nor the paper tube can be moved vertically by the downward movement of the interior gripper 37 and placer 60 as the placer 60 is withdrawn from below the candy ball. The paper tube is then severed at the proper distance below the candy ball by means of shears composed by blades 67 and 68 pivoted at 69, and operated by a toggle joint 70. Said toggle joint 70 is operated by a wiper cam 71 acting on the cam lever 72; said wiper cam is revolved by suitable gearing 73 driven by the shaft 64 which also rotates the twisting mechanism. As the action of the shears upon the tube tends to force the tube toward their points slightly, and as there is nothing to prevent the tube of paper unrolling as the cutting takes place we provide a pair of movable fingers 74 pivoted at 75 and held against the tube by the spring 76. The fingers 74 are moved out of the way of the tube of paper when it is moved up into position by means of projection 901 on the disk 63.

The mechanism by means of which the ends of the tube of paper are twisted will now be described. The further rotation of the disk 63 releases the ball from the slotted spring 62 and it is then caught between the twisters which comprise a movable member 77 on the disk 63 and a fixed member 78 which is supported on the frame of the machine. The fixed member is provided with top and bottom plates 79 and 80 (see Fig. 10) which project toward the disk 63 and are curved to correspond in shape with the periphery of the disk 63. Between the top and bottom plates 79 and 80 is located a curved rubber surface 81 against which the ball lies. The twister 77 on the disk 63 is composed of corresponding parts, and has top and bottom plates 82 and 83 and a rubber surface 84 so that the ball is held between the two rubber surfaces 81 and 84. The two top plates and the two bottom plates are separated from each other by a space which is slightly greater than the thickness of the folds of the wrapper after it has been twisted. The movable gripper on the disk 63 is adjustable toward and away from the stationary gripper by means of cap screws 85 located in slots 86. It will be seen that as the disk 63 revolves the ball is caught between the two rubber surfaces 81 and 84 and caused to revolve, as the rubber surface 81 is stationary while the rubber surface 84 travels past it. Since the ends of the wrapper extend upwardly and downwardly in the spaces between the pair of top plates and the pair of bottom plates they cannot turn but slide in this space and it results that the ball is twisted relatively to the ends of the wrapper and the twists are in the same direction. The fingers 74 are also moved out of the way when the twisting takes place by means of the guide 87 (see Fig. 9) carried on the moving twister. The fixed twister is spring-pressed against the moving twister, being carried on guide pins 88 and 89 and outwardly pressed by springs 90 and 91. The motion of the said fixed twister toward the movable twister is limited by means of the bolt 92. This arrangement compensates fully for any usual variation in size of the balls. When the moving twister has passed the fixed twister the wrapped ball of candy drops from the machine to a proper receptacle or place to receive it.

The machine operates as follows: The tube feeding mechanism forms the tube drawing the paper from the roll and operates to feed upwardly a length of tube sufficient to wrap one ball of candy for the twisted ends of the wrapper; a single ball drops from the delivery tube of the hopper into the cup which descends and leaves the ball supported on the placer and properly positioned inside the tube of paper. The ball is then seized between a spring on the twister and the spoon shaped finger and the placer is withdrawn. A finger holds the paper tube in shape while the shears are severing the tube at the proper point. The ball is then caught between the moving and fixed twisters and as the moving twister passes the fixed twister the ball is rolled along between the two completely twisting the wrapper at each end and as the movable twister passes beyond the fixed twister the wrapped ball is dropped clear of the machine. The grippers which feed the tube upwardly then operate to pull the crushed end of the tube, which results from the severing operation downwardly over the edge of the cup thus restoring the tube to its smooth cylindrical form preparatory to the next upward feed movement. This immediately takes place and the operations heretofore described are repeated.

What we claim is:—

1. In a candy wrapping machine, the combination of tube forming mechanism, and a placer extending upwardly into the tube of paper to support the piece of candy to be wrapped in proper position within the tube of paper formed by the tube forming mechanism.

2. In a candy wrapping machine, the combination with tube-forming mechanism and a placer extending upwardly into the tube of paper to support the piece of candy to be wrapped, in proper position within the tube of paper, with interior and exterior grippers and means to reciprocate said grippers vertically and to open and close said grippers upon the tube of paper to feed the tube relatively to the placer.

3. In a candy wrapping machine, the combination with tube forming mechanism, and a placer extending upwardly into the tube of paper to support the piece of candy to be wrapped in proper position within the tube of paper formed by the tube-forming mechanism, and a pair of tubular guides one inside the other to guide the paper vertically, said interior tubular guide being flared slightly at its outside edge to straighten the tube of paper when it has become crushed.

4. In a candy wrapping machine, the combination with tube forming mechanism, feeding mechanism for the tube formed thereby, and holding mechanism to support the tube and a piece of candy therein, while the tube feeding mechanism is moved out of position, comprising a spoon finger and a rotating slotted spring, said spoon finger engaging the piece of candy on one side and the slotted spring engaging the piece of candy on the other side.

5. In a machine of the character described, the improved wrapper twisting mechanism comprising a fixed twisting member and a moving twisting member, both of said twisting members being provided with top and bottom plates of corresponding shape between the proximate edges of which is a space through which the ends of the wrappers project, both of said twisting members being also provided with resilient portions located between said top and bottom plates, said resilient portions contacting with the portion of the wrapper over the piece of candy being wrapped whereby the central portion of the wrapper containing the candy is rotated while the ends are held from rotating between the pair of top and bottom plates.

6. In a machine of the character described, the improved wrapper twisting mechanism comprising a fixed twisting member and a rotating twisting member, both of said twisting members being provided with top and bottom plates of corresponding shape between the proximate edges of which is a space through which the ends of the wrappers project, both of said twisting members being also provided with rubber portions located between said top and bottom plates, said rubber portions contacting with the portion of the wrapper over the piece of candy being wrapped, whereby the central portion of the wrapper is rotated while the ends are held from rotating between the pair of top and bottom plates.

7. In a machine of the character described, tube forming mechanism, a vertically reciprocating cup located within the tube of paper formed by the tube forming mechanism and candy feeding mechanism adapted to deliver the pieces of candy one by one into the said cup.

8. In a machine of the character described, tube forming mechanism, a vertically reciprocating cup located within the tube of paper formed by the tube forming mechanism, and a placer located within the cup and adapted to support the piece of candy in proper position after the descent of the cup.

In testimony whereof we affix our signatures, in presence of two witnesses.

STEPHEN M. HAMBLIN.
GEORGE N. HAMBLIN.

Witnesses:
 IDA M. EVERETT,
 JAMES E. GRIMES.